(12) United States Patent
Schmidt et al.

(10) Patent No.: US 8,790,484 B2
(45) Date of Patent: Jul. 29, 2014

(54) METHOD FOR PRODUCING A MULTILAYER SYSTEM AND CORRESPONDING MULTILAYER SYSTEM

(75) Inventors: Manuela Schmidt, Filderstadt-Sielmingen (DE); Martina Daub, Weissach (DE); Jochen Rupp, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/180,774

(22) Filed: Jul. 12, 2011

(65) Prior Publication Data

US 2012/0009006 A1    Jan. 12, 2012

(30) Foreign Application Priority Data

Jul. 12, 2010 (DE) .......................... 10 2010 031 212

(51) Int. Cl.
    *B29C 65/16* (2006.01)
(52) U.S. Cl.
    CPC ...................................... *B29C 65/16* (2013.01)
    USPC ...................................................... 156/272.8
(58) Field of Classification Search
    CPC   B29C 65/16; B29C 65/1635; B29C 65/1677;
          B29C 65/168; B32B 7/04; B32B 7/045;
          B32B 37/06; B32B 37/04; B32B 37/0076;
          B32B 37/12
    USPC ......... 156/272.2, 272.8, 308.2, 290, 291, 295
    See application file for complete search history.

(56) References Cited

U.S. PATENT DOCUMENTS

| 7,244,482 | B2 * | 7/2007 | Bager et al. ................... 428/35.2 |
| 2005/0000641 | A1 * | 1/2005 | Hartmann et al. .......... 156/272.8 |
| 2005/0079360 | A1 * | 4/2005 | Watanabe et al. ........... 428/411.1 |
| 2005/0227031 | A1 * | 10/2005 | Yang et al. .................... 428/40.1 |
| 2008/0213542 | A1 * | 9/2008 | Huo et al. ...................... 428/172 |

FOREIGN PATENT DOCUMENTS

| DE | 695 04 923 | T2 |   | 4/1999 |
| DE | 197 53 846 |    |   | 6/1999 |
| DE | 695 12 584 | T2 |   | 4/2000 |
| DE | 102 22 574 |    |   | 11/2003 |
| DE | 10335446   | A1 | * | 2/2005 |
| DE | 103 38 732 | A1 |   | 3/2005 |
| DE | 20 2009 015 334 | U1 |   | 2/2010 |
| EP | 1 524 097  | A1 |   | 4/2005 |
| JP | 2003-136598 | A |   | 5/2003 |

* cited by examiner

*Primary Examiner* — Daniel McNally
(74) *Attorney, Agent, or Firm* — Maginot, Moore & Beck

(57) ABSTRACT

A method for producing a multilayer system with at least two joining elements, these being produced in particular from plastic, is disclosed. The method includes applying a compensating means, for at least partially compensating for mechanical stresses, to a first joining element, applying a second joining element to the compensating means, for joining together the first and second joining elements, firstly connecting the first joining element to the compensating means and secondly connecting the second joining element to the compensating means. A corresponding multilayer system and a corresponding use is also disclosed.

7 Claims, 2 Drawing Sheets

METHOD FOR PRODUCING A MULTILAYER SYSTEM AND CORRESPONDING MULTILAYER SYSTEM

This application claims priority under 35 U.S.C. §119 to German patent application no. DE 10 2010 031 212.6, filed Jul. 12, 2010 in Germany, the disclosure of which is incorporated herein by reference in its entirety.

BACKGROUND

The disclosure relates to a method for producing a multilayer system with joining elements, these being produced in particular from plastic, to a corresponding multilayer system and to a corresponding use.

Multilayer systems are used in a wide variety of areas of technology. For instance, DE 695 15 84 T2 discloses a multilayer system which is formed by a repair paint with special effect pigments. DE 695 04 923 T2 furthermore discloses a magnetoresistance sensor with a self-polarized multilayer system.

Furthermore, optical elements in the form of multilayer systems are also known. For instance, DE 20 2009 015 334 U1 discloses an optically active multilayer system for solar absorption, comprising a reflection layer and an absorber layer, an antireflection layer being arranged between the reflection layer and the absorber layer. Also arranged between the absorber layer and the reflection layer is a further layer and an optically active layer of a metal compound with a stoichiometric composition.

DE 102 22 574 A1 discloses a method for producing a multilayer system and a multilayer system with a first layer, which comprises a first at least partially chemically polymerized monomer and a monomer which is at least partially polymerized by light curing, and with at least one second layer, which comprises a second at least partially chemically polymerized monomer, the first and second monomers forming polymers which extend across the interface between the first and second layers. Such a method has the disadvantage in particular that it is only to a very limited extent that different materials can be used for the individual layers.

Furthermore, the applicant is familiar from a reference with the practice of connecting various layers of a multilayer system to one another by means of adhesive bonding. It is in this case disadvantageous, however, that a strength or reliability of an adhesively bonded connection between the various layers is determined by the forces of adhesion between the adhesive and the respective layers of the multilayer system and the cohesion of the adhesive itself.

Finally, DE 197 53 846 A1 discloses a welding method for welding color plastic profiles. Welding has the advantage over adhesive bonding that there is no need for the adhesive, or adhesives, to be applied and cured. In the case of welding, however, the respective layers are melted, that is to say they expand on account of the development of heat. When a welded seam is created, they subsequently contract again. As a result, intrinsic mechanical stresses are included in the region of the welded seam, impairing the strength of the welded connection. Therefore, if, for example, the coefficients of thermal expansion of a first and a second layer that are to be joined together to form a (multi-)layer system are very different in magnitude, correspondingly higher mechanical stresses occur. In the case of multiple layers that are to be respectively connected by means of welding, these stresses increase and the risk of a rupture of a welded seam at some point in the multilayer system increases considerably.

If the multilayer system is also exposed to further mechanical and/or thermal loads in further processing steps, this risk is once again increased significantly.

SUMMARY

The method defined herein for producing a multilayer system from at least two joining elements, these being produced in particular from plastics, comprises the steps of applying a compensating means, for at least partially compensating for mechanical stresses, to a first joining element, applying a second joining element to the compensating means, firstly connecting the first joining element to the compensating means and secondly connecting the second joining element to the The multilayer system set forth below comprises at least a first joining element and a second joining element and a compensating means, for at least partially compensating for mechanical stresses, in particular taking the form of a film, preferably an elastomer film, the compensating means being arranged between the first and second joining elements and the compensating means being respectively connected to the first and second joining elements, in particular locally.

Further, there is a use of compensating means for at least partially compensating for mechanical stresses, in particular in the form of a film, preferably an elastomer film, between at least two joining elements of a multilayer system.

The method, the multilayer system, and the use disclosed below have the advantage that the strength and reliability of the connection between two neighboring joining elements, and consequently also of a respective multilayer system, is thereby improved. At the same time, the flexibility of multilayer systems is thereby increased, since additional layers can be applied or greater multilayer systems can be produced, without mechanical stresses between the joining elements increasing.

Further features and advantages of the disclosure are set forth below.

According to a further advantageous development of the disclosure, the first and/or second connection is/are performed with a material bond, in particular on the basis of local thermal radiation. The advantage here is that, with local thermal radiation in particular, the energy respectively required only has to be introduced between the joining elements at a specific point or points, so that consequently the respective joining elements do not have to be exposed completely to thermal loading. At the same time, a reliable and durable connection between the two joining elements is made possible.

According to a further advantageous development of the disclosure, the first and/or second connection is/are performed on the basis of laser beams, preferably by means of transmission laser welding. The advantage here is that local thermal radiation can be produced thereby in a simple and reliable way, so that a connection between the first and second joining elements can be reliably established by means of the compensating means.

According to a further advantageous development, the first and second connections are performed simultaneously and/or at least one joining element is of an at least partially optically transparent form. The advantage here is that connection of the first and second joining elements is thereby made possible in a single step, that is to say simultaneously. The time for producing a multilayer system is thereby shortened, without reducing the reliability or the durability of a connection between two neighboring joining elements.

According to a further advantageous development, the compensating means are formed as a film, in particular as an elastomer film, preferably as a thermoplastic elastomer film. This has the effect on the one hand of keeping the expenditure on material for a connection between the two joining elements as low as possible, while at the same time a film can be produced easily and at low cost and can be applied to the first and/or second joining element in a simple manner.

According to a further advantageous development of the disclosure, the compensating means are structured, preferably formed in the manner of a network or grid. The advantage of this is that structures in the form of channels, etc., for example, can be thereby produced between the two joining elements. These channels may be used, for example, for passing through a fluid, etc., for microfluidic applications. This significantly increases the flexibility of such a multilayer system.

According to a further advantageous development of the multilayer system, it comprises alternating layers comprising joining elements and compensating means, these being respectively connected to one another, in particular locally, the connecting points of the compensating means in relation to two neighboring joining elements being arranged substantially midway between connecting points of vertically neighboring compensating means. The advantage here is that the connecting points are thereby arranged in a checkerboard manner, substantially in one plane, between two joining elements, and in the case of more than two joining elements a regular three-dimensional grid of connecting points is created overall between two neighboring joining elements, which increases the mechanical stability of the multilayer system considerably.

BRIEF DESCRIPTION OF THE DRAWINGS

Exemplary embodiments of the disclosure are explained in more detail in the description which follows and are represented in the drawing, in which.

DETAILED DESCRIPTION

In the figures, the same reference signs designate elements that are the same or functionally the same, unless otherwise described.

FIG. 1 shows production steps of a method according to a first embodiment of the present disclosure. In FIG. 1, reference sign 1 designates a first joining element in the form of a transparent thermoplastic. A second joining element 3 likewise takes the form of a transparent thermoplastic. Arranged between the two joining elements 1, 3 as a compensating means is an absorbent, thermoplastic elastomer film 2. The two joining elements 1, 3 are in this case of a sheet-like form.

Figure 1A:
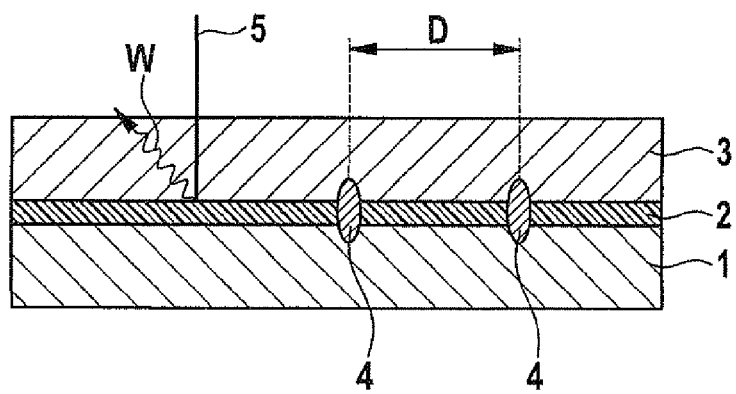
FIG. 1 shows production steps of a method according to a first embodiment of the present disclosure.

According to FIG. 1a, the structure from the bottom upward is as follows: Arranged on the first joining element 1 is the thermoplastic elastomer film. This film is mechanically in the best possible contact with a surface of the joining element 1. Arranged on the thermoplastic elastomer film 2, likewise mechanically in the best possible contact, is a second, transparent joining element 3. The two-layer system, with the two joining elements 1, 3 and the thermoplastic elastomer film 2 arranged between the two joining elements 1, 3, is then exposed to laser radiation 5 from above. The laser beam 5 thereby passes through the transparent joining element 3 from above and is absorbed by the thermoplastic elastomer film 2. Heat is produced at the point of the absorption of the laser beam 5, and the thermoplastic elastomer film 2 is melted at this point. At the same time, the two joining elements 1, 3 in the form of thermoplastics are likewise melted by the heat, so that the two joining elements 1, 3 and the thermoplastic elastomer film 2 are connected by means of welded seams 4. The welded seams 4 are in this case arranged regularly at a distance D from one another.

Figure 1B:
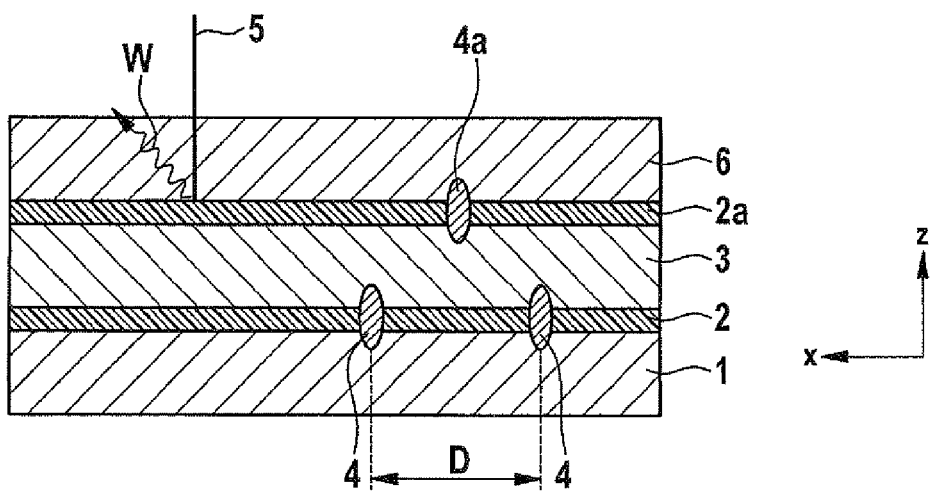

In a second step according to FIG. 1b, a further thermoplastic elastomer film 2a is then applied to the joining element 3 and to this in turn a third joining element 6 is applied. The joining element 3, the thermoplastic elastomer film 2a and the third joining element 6 are in turn in good mechanical contact with one another. By analogy with the description of FIG. 1a, a laser beam 5 is then radiated onto the thermoplastic elastomer film 2a, while passing through the transparent third joining element 6, to produce a welded seam 4a between the second joining element 3 and the third joining element 6. In this case, as described in the description of FIG. 1a, the thermoplastic elastomer film 2a as well as the second joining element 3 and the third joining element 6 are in turn melted in the region of the point of impingement of the laser beam 5 on the thermoplastic elastomer film 2a, the latter and the neighboring two joining elements 3, 6, and a welded seam 4a is formed. In the viewing direction of the laser beam 5, the welded seam 4a between the two joining elements 3, 6 is in this case arranged at half the distance D/2 between two neighboring welded seams 4 between the two joining elements 1, 3. It goes without saying that this not only applies to a single welded seam 4a and two welded seams 4, but rather the welded seams 4 and 4a between the first and second or second and third joining elements 1, 3, 6 may be respectively arranged offset in relation to one another by D/2 respectively in the vertical viewing direction according to FIG. 1b, in order in this way to make possible a connection of the multilayer system comprising the three joining elements 1, 3, 6 that is as stable as possible. In this case it is likewise possible, for example, to provide a greater distance between the welded seams 4 or the welded seams 4a in the inner region of the multilayer system 1, 3, 6 and a smaller distance in the peripheral region, in order to increase the strength of the multilayer system 1, 3, 6 in the peripheral region. It goes without saying that any other arrangement or distribution of the welded seams 4, 4a is also possible.

Figure 2:
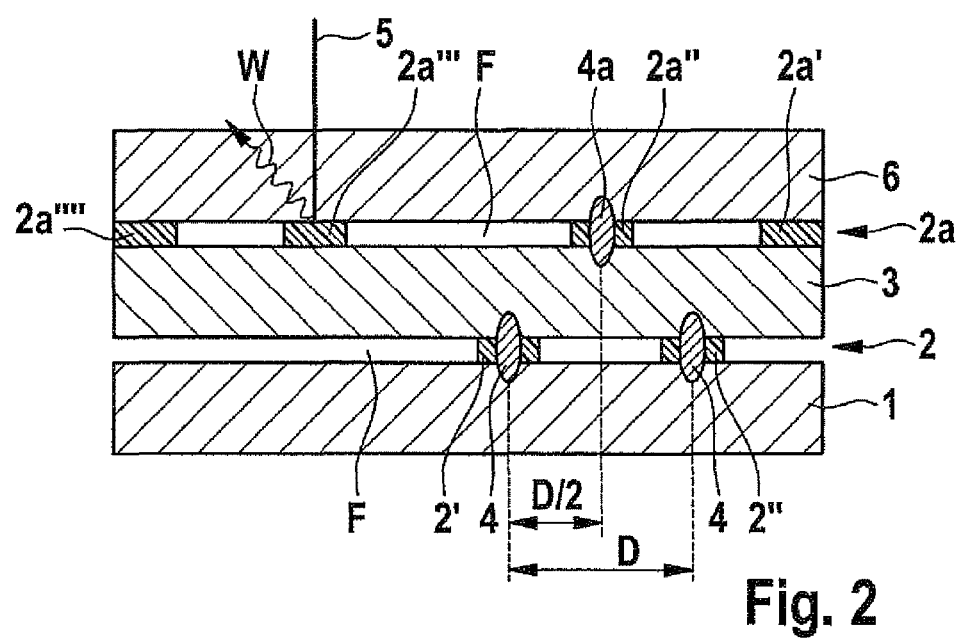
FIG. 2 shows a multilayer system according to a second embodiment of the present disclosure.

FIG. 2 shows a multilayer system according to a second embodiment of the present disclosure. In FIG. 2, a multilayer system with three joining elements 1, 3, 6 is shown by analogy with FIG. 1b. As a difference from FIG. 1b, the thermoplastic elastomer films 2, 2a between the joining elements 1, 3 and the joining elements 3, 6 are now not arranged continuously but in a structured manner, for example in the form of a grid. This has the effect of creating clearances F and portions 2', 2'', 2a', 2a'', 2a''', 2a'''' of the elastomer films 2, 2a between the respective joining elements 1, 3 and 3, 6 following one another in the vertical direction. These clearances F may be used here for microfluidic applications. The joining elements 1, 3, 6 may in this case be formed such that not only is it possible for liquid to be transported in the plane of the thermoplastic elastomer film 2, 2a but the joining elements 1, 3, 6 may themselves be structured, that is to say for example comprise vertical and/or horizontal channels which interact with the corresponding channels or clearances F of the structured thermoplastic elastomer films 2, 2a, so that altogether a fluid of a microfluidic application can be transported or flow through the multilayer system both horizontally and vertically.

To connect the two joining elements 1, 3 to the thermoplastic elastomer film 2 as well as to connect the two joining elements 3, 6 by means of the thermoplastic elastomer film 2*a*, the laser beam 5 is used at the points at which film regions 2', 2", 2*a*', 2*a*", 2*a*''', 2*a*'''' are arranged. These are then exposed to the laser beam 5, so that welded seams 4, 4*a* are produced at the aforementioned points and the joining elements 1, 3 or joining elements 3, 6 are respectively connected by means of the respective film 2, 2*a*.

Although the present invention has been described above on the basis of preferred exemplary embodiments, it is not restricted to these but can be modified in various ways.

What is claimed is:

1. A method for producing a multilayer system, the method comprising:
    applying a first compensator to a first joining element;
    applying a second joining element to the first compensator;
    applying a second compensator to the second joining element;
    applying a third joining element to the second compensator; and
    using a laser to form first laser welds in the first compensator, the first laser welds extending into the first joining element and the second joining element to connect the first joining element and the second joining element to the first compensator, the first laser welds being spaced apart from each other in the first compensator layer;
    using a laser to form second laser welds in the second compensator, the second laser welds extending into the second joining element and the third joining element to connect the second joining element and the third joining element to the second compensator, the second laser welds being located in the second compensator at positions that are laterally offset relative to the positions of the first laser welds in the first compensator.

2. The method of claim 1, wherein each of the second laser welds is located at a position in the second compensator that is midway between the relative positions of adjacent first laser welds in the first compensator.

3. The method of claim 2, wherein the first laser welds and the second laser welds are positioned in a checkerboard pattern relative to each other.

4. The method of claim 1, wherein the first compensator and the second compensator each comprise thermoplastic elastomer films.

5. The method of claim 1, wherein the first joining element and the second joining element are formed of plastic.

6. The method of claim 1, wherein at least one of the first and the second compensators forms a grid, the grid defining a plurality of clearance spaces.

7. The method of claim 6, wherein the clearance spaces form channels that are configured to transport fluid.

* * * * *